United States Patent [19]
Gustafsson

[11] 3,984,050
[45] Oct. 5, 1976

[54] HEAT PUMP SYSTEM
[75] Inventor: Berth Ulrik Gustafsson, Osterskar, Sweden
[73] Assignee: Projectus Industriprodukter AB, Stockholm, Sweden
[22] Filed: Apr. 10, 1975
[21] Appl. No.: 566,718

[30] Foreign Application Priority Data
Apr. 18, 1974 Sweden .............................. 7405261

[52] U.S. Cl. ................................. 237/2 B; 62/238; 62/335
[51] Int. Cl.² .......................................... F25B 29/00
[58] Field of Search ............. 237/2 B, 19, 8 R, 8 C; 62/238, 335

[56] References Cited
UNITED STATES PATENTS
2,102,940  12/1937  Buchanan .......................... 237/19 X
2,242,588  5/1941  McGrath ............................. 237/2 B Primary Examiner—William E. Wayner
Attorney, Agent, or Firm—Toren, McGeady and Stanger

[57] ABSTRACT

There is provided a heat pump system comprising two cascade coupled heat pumps. The hot side of the system may be connected in series with an oil-fired boiler in a radiator circuit of conventional water heating installation, wherein a hot water heater is coupled in parallel to the boiler. The low temperature heat pump has two series connected condensors of which one is connected to the evaporator of the high temperature heat pump, while the other is useful for heating radiator water flowing in a shunt pipe parallel with the boiler. A threeway shunt valve controls the mix of water of different temperatures from the boiler and the shunt pipe respectively, so that water of a desired temperature is let into the raiser pipe of the radiator circuit.

5 Claims, 1 Drawing Figure

U.S. Patent  Oct. 5, 1976  3,984,050
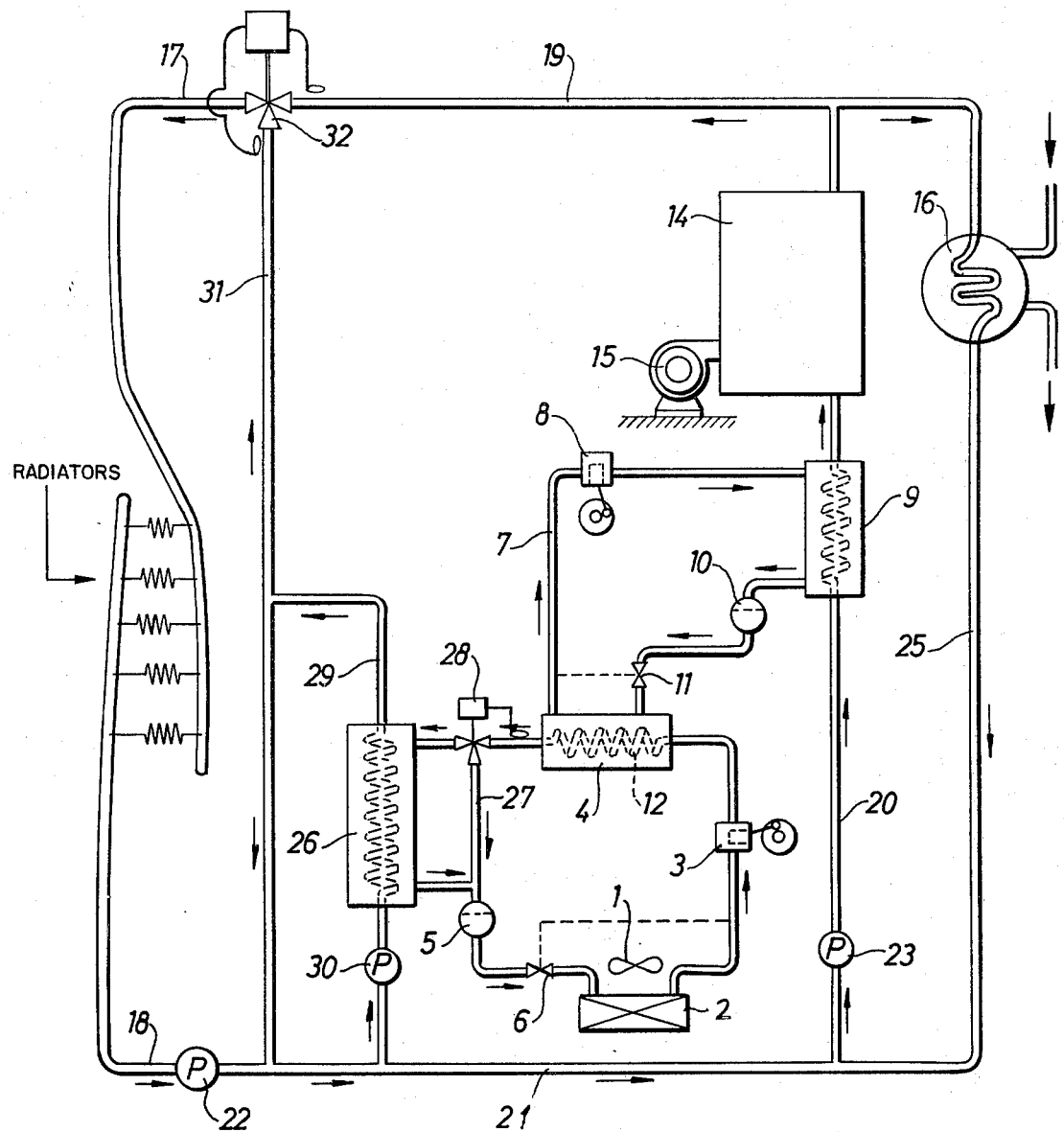

HEAT PUMP SYSTEM

The present invention relates to a heat pump system comprising at least two heat pumps each incorporating a refrigerant circuit containing, in series, an evaporator, a compressor, a condenser unit and an expansion valve. The invention relates in particular to a heat pump system for the economical production of high temperature energy extracted from waste heat or the outside atmosphere.

One object of the invention is to use heat pumps in order to heat up a medium such as water to at least two different temperature levels, for utilisation in different applications.

Another object of the invention is to use heat pumps to generate low pressure steam or hot water from process heat stemming for example from papermaking machines or from warm waste water.

Another object of the invention is to utilise heat pumps in combination with conventional hot water heating installations employing for example oil-fired boilers, in order to heat dwellings or work locations whilst at the same time producing hot water for other uses.

Yet another object of the invention is to provide a method and installation designs, which yield favourable joint control of a conventional heating installation and heat pumps connected thereto.

Other applications and advantages of the invention will become apparent to the person skilled in the art, from the following.

In accordance with the invention, the heat pump system referred to introductorily is characterised in that the heat pumps are cascade-connected so that the condenser unit of one heat pump is arranged in a heat-exchanging relationship with the evaporator of the other heat pump, so that an external medium such as water can be heated to a high temperature relatively to the temperature of the first evaporator. This kind of heat pump system can be connected to a conventional water heating installation equipped with a fuel-fired boiler and comprising a radiator circuit with a shunt line connected to the riser line of the radiator circuit via a shunt valve, the heating installation furthermore incorporating a hot water heater supplying water for other uses. Here, the condenser unit of the first heat pump can comprise a first condenser to which there is connected the evaporator of the second heat pump, and a second condenser which is arranged, by heat exchange, to heat the radiator circuit water which is taken from the return line of the radiator circuit to the shunt line, whilst the second heat pump is arranged in series with the boiler in order to heat the radiator circuit water flowing through the boiler. With a heating installation of this kind, another shunt line can be arranged in the first heat pump circuit, parallel with the second condenser, and in addition a second shunt valve will be arranged at the second condenser in order to control the refrigerant flow through said second condenser.

The invention will be described in more detail in the attached claims.

The invention will now be described more particularly with reference to the attached drawing which illustrates a heat pump system for two temperature levels, said system being incorporated into a conventional water heating installation for the production of water at two temperatures, for example, in order to supply radiators and in order to supply water for other uses. The drawing shows a first heat pump comprising an evaporator 2 associated with a fan 1, the evaporator being intended for installation outside. In addition, the first heat pump comprises a compressor 3, a condenser 4, a droplet collector 5 and an expansion valve 6. The components 2 to 6 are connected in series with one another in a circuit which is filled with a refrigerant for example of the Freon type. A second heat pump is connected in cascade with the first. The second heat pump comprises a refrigerant circuit 7 containing, in series, a compressor 8, a condenser 9, a droplet collector 10, an expansion valve 11 and an evaporator 12 which is designed to receive heat from the condenser 4 of the first heat pump, by arranging it in heat exchanging relationship therewith. The condenser 9 of the second heat pump is designed, by heat exchange, to transfer the heated condensation to the medium such as water flowing through it.

The above described heat pump system, with two cascade-connected heat pumps, can be employed in order to develop high temperatures in the condenser of the second heat pump, even if the evaporator of the first heat pump is being supplied with air at low temperature. Accordingly, a system of this kind can be optimised by using standard pipes for the refrigerant circuits, the pipes having for example a pressure limit of 24 atmospheres absolute. If, for the first heat pump, the refrigerant chosen is Freon 22, then at an evaporator temperature of −10° C this refrigerant will have a pressure of 3.62 atmospheres absolute. The refrigerant can then be compressed to a pressure of for example 19.7 atmospheres absolute at which pressure the condenser has a temperature of 50° C, suitable for the production of heat for radiators. The evaporator of the second heat pump then has a temperature of around 45° C. If Freon 12 is used as the refrigerant in the second heat pump, then at a temperature of 45° C this medium will have a pressure of around 11.1 atmospheres absolute. The Freon 12 is then compressed to a pressure of 23.65 atmospheres absolute at which pressure the condenser of the second heat pump has a temperature of 80° C, a temperature suitable for the production of hot water for other purposes.

Alternatively, the heat pump system can be utilised to produce low pressure steam as follows. The evaporator of the first heat pump is arranged in a heating medium environment at a temperature of 50° C. If Freon 12 is used in the first heat pump, then at 50° C this will have a pressure of 12.5 atmospheres absolute. The Freon 12 is compressed to a pressure of 23.65 atmospheres absolute so that the refrigerant in the condenser acquires a temperature of 80° C. The evaporator of the second heat pump then reaches a temperature of around 75° C. If the second heat pump circuit is filled with Freon 114, then at 75° C this has a pressure of 8.5 atmospheres absolute. In order, in the second heat pump, to achieve a condenser temperature of 135° C, the Freon 114 is compressed to a pressure of 27.7 atmospheres absolute. This means that the next grade must be chosen for the pipes and accessories of the second heat pump, but this may be an acceptable concession since in this way the condenser is capable of producing steam at a temperature of 135° C and a pressure of 3.13 atmospheres absolute. Furthermore, it may be necessary in the case of the compressor associated with the second pump, to improve the cooling and this can be done by drawing coolant from the compressor of the first heat pump, a procedure which has been found favourable.

In the context of the applications of the heat pump system in accordance with the invention, which have thus far been described, it is a possible course to utilise compressors with two or more pistons which can be connected and disconnected in order to vary the refrigerant flow in accordance with the heat demand.

To return now to the drawing, there can be seen there a boiler 14 with an oil burner 15 assigned to it, and a separate hot water heater 16 coupled in parallel with the boiler. The boiler 40 is connected to the riser line 17 of the radiator circuit and to the return line 18 of the radiator circuit, via pipes 19, 20 and 21. The radiator water is circulated by a pump 22 in the return line 18, and the water is circulated through the boiler by another pump 23 in the line 20. The condenser of the second heat pump is connected in a heat-exchanging relationship with the line 20. The hot water heater is connected in parallel with the boiler, condenser 9 and pump 23, by a pipe 25.

The condenser unit of the first heat pump can comprise two condensers, namely the aforementioned condenser 4 and, in addition in series therewith a second condenser 26. A shunt line 27 is connected in parallel with the low temperature condenser and said line 27 is connected to the main circuit of the heat pump via a shunt valve 28 which may be automatic and which controls the flow through the condenser 26 in accordance with the refrigerant heat content after the condenser 4. The condenser 26 is arranged in a heat-exchanging relationship with a pipe 29 which, with the help of a pump 30, supplies water from the pipe 21 to a shunt line 31 extending between the riser line 17 and the return line 18 of the radiator circuit. The shunt line 31 is connected to the riser line 17 and the pipe line 19 via a riser line shunt 32 which may if required be of automatic, temperature-responsive kind.

The above described heating installation operates in the following manner. The refrigerant in the first heat pump absorbs heat in the evaporator 2 and is compressed by the compressor 3 so that it acquires a temperature of for example 50° C. The compressor 3 can preferably be at multiple stage (two cylinder) type, so that its capacity can be adjusted to the existing demands, without any need to frequently stop the compressor drive motor. The refrigerant condenses in the condenser 4 and there yields up at least part of its heat to the refrigerant flowing through the evaporator 12 of the other heat pump. The refrigerant in the other heat pump is compressed by the compressor 8 and condensed in the condenser 9 where it transfers its heat content to the water which is being circulated by the pump 23 through the line 20 of the boiler 14. The maximum temperature levels for the two heat pumps are preferably 55° and 90° C respectively.

If the refrigerant in the first heat pump has an adequately high temperature after the condenser 4 then the shunt valve 28 automatically feeds the refrigerant to the condenser 26 where the residual heat of the refrigerant is transferred to the water which is being circulated by the pump 30 through the pipe 20 in heat-exchanging relationship with the condenser 26. The water which is heated by the condenser 26 is warmed for example to 50° C, flows through the pipe 29 and through the shunt line 31. If the temperature of this water is suitable, then the shunt valve 32 feeds it into the riser line 17. If, on the other hand, the temperature of the water which leaves the line 29 is too low, then it will flow back to the pipe 21 for eventual recirculation. The water fed back from the radiator circuit to the pipe 21, is pumped by the circulation pump 23 through the line 20, the high temperature condenser 9 and the boiler 14. The high temperature condenser, whose temperature is for example 80° C, can at least in normal circumstances and during summer time, raise the water to a temperature of 80° C which is a suitable temperature for domestic tap water. The water heated in the condenser 9 flows through the boiler 14 and through the hot water heater 16 and back to the pipe 21. In addition the water, after the boiler, flows through the pipe 19 to the riser line shunt which detects the temperatures in the lines 31 and 19 and mixes the flows which they carry to give a suitable temperature in the riser line 17. Thus, the water in the boiler 14 generally maintains a temperature of 80° C at least during summer time and under normal circumstances of utilisation of hot tap water, and if the oil burner is then adjusted so that it is not set into operation until the boiler water temperature undershoots 75° C for example, then the oil burner can remain inoperative during the summer six months. If, however, the radiator hot water demand increases, then the capacity of the heat pump system will cease to be sufficient to cope with both hot water production and radiator water production, and the boiler water temperature will therefore sink with the result that the oil burner will out in accordance with the demand. Thus, a gentle transition is achieved between different heat energy demands thanks to the installation proposed here.

The background to the indicated kinds of installations for the production of high temperature energy with the help of heat pumps, is that in temperate climates, where for example the mean annual temperature rises to some few degrees centigrade plus, it is largely impossible, with the help of a single heat pump, to achieve the high temperatures which are required for the production of both domestic hot water and radiator water, or simply high temperature energy for use in industrial applications. This is due amongst other things to the fact that in order, using a heat pump and commencing from a low temperature, to achieve a high temperature the refrigerant must be compressed to a very considerable extent indeed. This means that the compresser has a very large clearance volume and at high compression levels this clearance volume has a prejudicial effect upon the efficiency of the heat pump, so much so that the developed heat energy tends towards or may indeed become less than, the input work of compression. Moreover, the use of this higher level of compression on the part of the refrigerant would require the use of high strength pipes since the pressure in the refrigerant circuit would be very high indeed. We have found that the efficiency, that is to say the ratio between the output energy and the input energy, is surprisingly favourable when using cascade-coupled heat pumps in accordance with the invention, this as compared with single heat pumps operating under conditions comparable with a single heat pump in the system in accordance with the invention.

What is claimed is:

1. A heat pump comprising at least a first heat pump and a second heat pump, said first heat pump incorporating a refrigerant circuit with, in series therein, a first evaporator, a first compressor, a first condenser unit, and a first expansion valve, said second heat pump incorporating a refrigerant circuit therein with, in series therein, a second evaporator, a second compressor, a second condenser unit, and a second expansion valve, a conventional water heating installation equipped with a fuel-fired boiler connected to said heat pump system, said water heating installation comprising a radiator circuit including a riser line with a shunt line connected to said riser line via a shunt valve, and a hot water heater supplying water for other uses, wherein the improvement comprises that said first and second heat pumps are cascade-coupled, said first condenser unit of said first heat pump is arranged in heat exchanging relationship with said second evaporator of said second heat pump, in which manner an external medium such as water can be heated to a high temperature relatively to the temperature of the first evaporator, said first condenser unit of said first heat pump comprises a first condenser incorporating said second evaporator of said second heat pump, and said first condenser unit includes a second condenser which is arranged to heat the radiator circuit water by heat exchange, said radiator circuit including a return line and the water being supplied from the return line of the radiator circuit to the shunt line, and said second condenser unit of said second heat pump comprising a third condenser arranged in series with said fuel-fired boiler in order to heat the radiator circuit water flowing through said boiler.

2. A system as claimed in claim 1, characterized in that a second shunt line is arranged in the circuit of said first heat pump in parallel with the second condenser of said first condenser unit, and in that a second shunt valve is arranged in said second shunt line in order to control the flow of refrigerant through said second condenser.

3. A method of building a heat pump system by the incorporation of at least two heat pumps, each comprising a refrigerant circuit with, in series therein, an evaporator, a compressor, a condenser unit and an expansion valve, in a conventional hot water installation equipped with a fuel-fired boiler and incorporating a radiator circuit with a shunt line which is taken to the riser line of the radiator circuit via a shunt valve, and a hot water heater supplying water for other uses, therein the improvement comprises placing the condenser unit of the first one of the heat pumps in heat-exchanging relationship with the evaporator of the second one of the heat pumps, and placing the condenser of the second one of the heat pumps in heat-exchanging relationship with the radiator circuit for heating the radiator water flowing through the boiler.

4. A method as claimed in claim 3, including arranging the condenser unit of the first one of the heat pumps in the form of two series-connected condensers, connecting one of the two series-connected condensers to the evaporator of the second one of the heat pumps and connecting the other one of the series-connected condensers in heat-exchanging relationship with a pipe which extends between the return line and the shunt line of the radiator circuit.

5. A method as claimed in claim 4, including placing another shunt line in parallel with the other condenser in the refrigerant circuit of the first heat pump which other condenser is in heat-exchanging relation with a pipe, and arranging another shunt valve at the point of connection of the another shunt line to the refrigerant circuit for regulating the flow through the other condenser.

* * * * *